US005729535A

United States Patent [19]

Rostoker et al.

[11] Patent Number: 5,729,535

[45] Date of Patent: Mar. 17, 1998

[54] METHOD AND APPARATUS FOR ADAPTING A COMPUTER FOR WIRELESS COMMUNICATIONS

[75] Inventors: Michael D. Rostoker, Boulder Creek; John Daane, Saratoga; Sandeep Jaggi, San Jose, all of Calif.

[73] Assignee: LSI Logic Corporation, Milpitas, Calif.

[21] Appl. No.: 581,676

[22] Filed: Dec. 29, 1995

[51] Int. Cl.$^6$ ........................................... H04N 7/04
[52] U.S. Cl. .................. 370/328; 370/468; 370/477; 348/390; 348/423
[58] Field of Search .................. 370/84, 79, 112, 370/95.3, 99, 109, 118, 310, 323, 328, 468, 477, 487, 490, 536, 537, 538, 543; 348/390, 399, 419, 384, 423; 395/100, 200.01, 200.13, 888, 2.91, 2.92

[56] References Cited

U.S. PATENT DOCUMENTS

| | | | |
|---|---|---|---|
| 5,231,492 | 7/1993 | Dangi et al. | 358/143 |
| 5,343,513 | 8/1994 | Kay et al. | 379/59 |
| 5,461,619 | 10/1995 | Citta et al. | 370/83 |
| 5,520,863 | 5/1996 | Yurt et al. | 375/240 |
| 5,526,350 | 6/1996 | Gittins et al. | 370/58.1 |
| 5,539,452 | 7/1996 | Bush et al. | 348/17 |
| 5,541,640 | 7/1996 | Larson | 348/19 |
| 5,548,532 | 8/1996 | Menand et al. | 370/112 |

OTHER PUBLICATIONS

Edward Lee and David Messerschmitt. "Digital Communication" 2nd Edition. Kluwer Academic Publishers. pp. 200, 214–219, 770–774, 789–792, 1994.

*Primary Examiner*—Alpus H. Hsu
*Assistant Examiner*—Kwang Bin Yao
*Attorney, Agent, or Firm*—Oppenheimer Poms Smith

[57] ABSTRACT

Disclosed herein is a computer capable of transmitting and receiving video and audio signals over an RF bandwidth. The RF bandwidth is allocated among the audio and video signals to allow the audio and video signals to be fitted within the RF bandwidth. The allocation is performed by varying the rates of compression of the audio and video signals. The video is displayed by using fast digital-to-analog converters and a dither technique. An existing computer can be configured for wireless communications by inserting into its backplate a board including a transceiver for transmitting and receiving compressed audio and video signals. The computer's microprocessor is programmed to perform the bandwidth allocation, and can even be programmed to compress and decompress the audio and video signals.

31 Claims, 3 Drawing Sheets

METHOD AND APPARATUS FOR ADAPTING A COMPUTER FOR WIRELESS COMMUNICATIONS

BACKGROUND OF THE INVENTION

The invention relates in general to wireless communication systems and in particular to an RF communication system for receiving and transmitting audio, video and data signals.

Today, wireless data solutions are enabling changes of great scope and depth in our society. Indeed, the wireless information revolution has the potential to democratize the information age like never before. Remotely accessible computers and data systems are becoming more and more available, putting us all on the verge of a world where an unlimited amount of information will be available anywhere, anytime.

Wireless data capabilities are also improving the productivity and accessibility of professionals in the field. The ability to send and receive information over airwaves instead of copper wires is liberating the professionals from their offices, giving them immediate access to databases and streamlining every aspect of their operations. Already, notebook computers equipped with advanced wireless communications software and radio frequency modems have enabled the formation of "virtual offices," offices that are removed from company headquarters. Now, a market analysts can track the stock market in his car while sitting in traffic during his commute to work. An engineer, instead of sitting in his office, can work on a CAD file from the pool side of his home.

The explosion of wireless data communication has been fueled by advances in semiconductor technology and software. These advances have allowed audio and data signals to be transmitted over digital networks in digital language, the language of computers.

Digital and mixed signal systems offer many advantages over old-fashioned analog systems. One important advantage is the ability of digital systems to transmit and receive more information at higher rates. Whereas analog systems are limited to transmitting audio at a rate of 64 Kbps, digital systems can compress audio transmissions and transmit eight times as much information at the same rate. Moreover, faster processors have allowed digital systems to transmit bits at ever increasing rates. By taking advantage of the compression routines and faster processors to transmit information more accurately and at higher rates, significant savings have been realized in both switching capacity and ongoing line costs.

Additional advantages have been realized through the use of multiple access techniques such as Time Division Multiple Access ("TDMA") and Code Division Multiple Access ("CDMA"). These techniques allow for multiple users to access a single bandwidth. They also allow for audio and data signals transmitted by a single user to be intermingled. These techniques make better use of scarce airwave space.

A recent development in the wireless information revolution has been the transmission of video signals over the airwaves. This is now being done in the television industry, as near-perfect images are being transmitted digitally on the Ku-band from satellites to home-mounted dishes as small as eighteen inches in diameter.

A similar development is occurring in the RF band, as efforts are being made to add video capability to cellular telephones, fax machines and computers. Before quality video capability can be added to these machines, however, a problem arising from bandwidth limitation must be overcome. Because these machines operate on a frequency of 900 MHZ, the bandwidth is not wide enough to transmit the enormous amount of video and audio information that is required for quality motion pictures. Bandwidth limitation may not be a problem for high frequency satellite transmissions, but it is a problem for the comparatively low frequency radio transmissions.

It would be quite advantageous for computers to communicate over the airwaves. Such computers could receive and transmit information at rates much higher than those communicating over copper wired networks. Such a computer could also tap into a local or wide area network without the need for laying down an infrastructure of cables. The cables are unsightly and expensive.

It would also be advantageous if existing computers could be adapted to communicate over the airwaves. Of course, the computer should be configured in a cost-effective manner, not using any more components than are necessary.

Therefore, it is an objective of the present invention to provide a computer that communicates over the airwaves.

It is another objective of the present invention to configure existing computers for wireless communications.

SUMMARY OF THE INVENTION

According to a broad aspect of the present invention, a wireless computer comprises a microprocessor; at least one digital transceiver operable to transmit and receive compressed video and audio signals over a fixed bandwidth; and computer memory for programming the microprocessor to dynamically allocate the fixed bandwidth among the video and audio signals. The dynamic allocation is performed by varying the rates at which the audio and video signals are compressed.

According to another aspect of the present invention, an existing computer can be configured to communicate over the airwaves by performing the steps of installing a wireless communication board in the backplate; and storing instructions in computer memory. The board includes at least one digital transceiver that is operable to transmit and receive compressed video and audio signals over a fixed bandwidth. The instructions cause the computer to dynamically allocate the fixed bandwidth among the video and audio signals. The dynamic allocation is performed by varying the rates at which the audio and video signals are compressed.

DETAILED DESCRIPTION OF THE PREFERRED EMBODIMENTS

Figure 1:
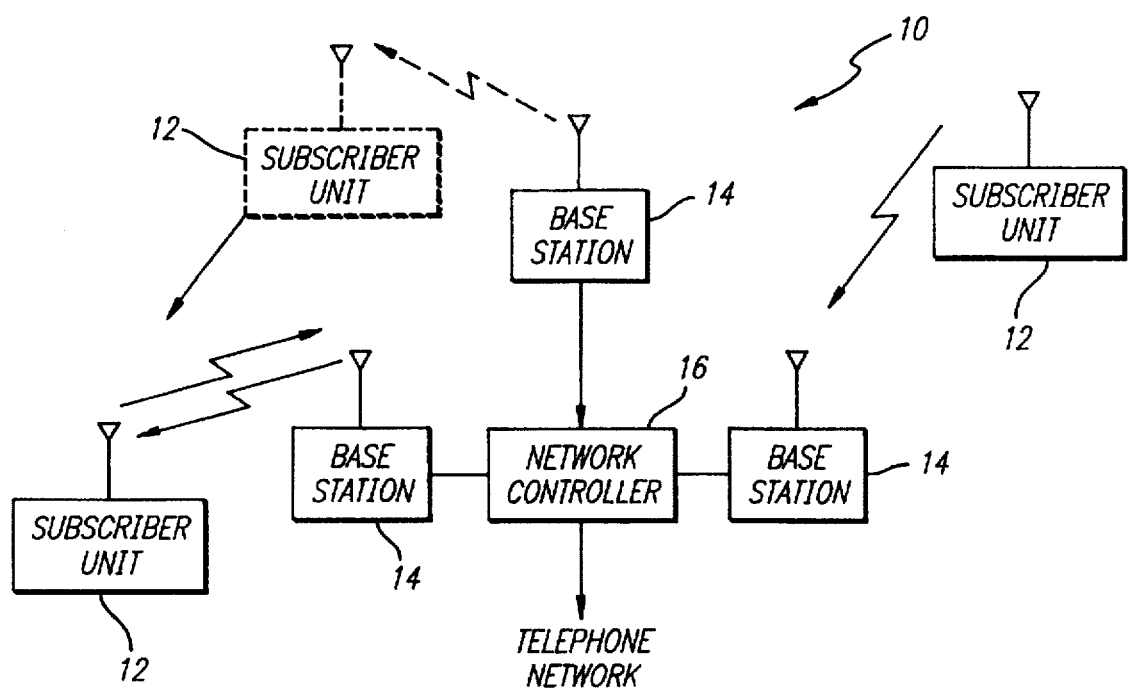
FIG. 1 is a schematic illustration of a cellular communication system.

FIG. 1 shows a cellular communication system 10 including a plurality of subscriber units 12 such as cellular telephones, fax machines and personal computers 13 according to the present invention. The system 10 also includes a number of base stations 14 that allow the subscriber units 12 to communicate with each other and with other communication devices in other networks.

The system 10 covers a geographical area that is divided into a grid of cell sites, with each cell site containing at least one base station 14. Each base station 14 communicates with all subscriber units 12 in its cell site via radio frequency ("RF") signals. One frequency is used for transmission from the base station 14 to the subscriber units 12 (the "downlink" frequency), and a different frequency is used for transmission from the subscriber units 12 to the base station 14 (the "uplink" frequency). The system 10 employs "frequency reuse" to allow more than one base station 14 to operate at the same radio frequency. Each cell site is made large enough so that RF signals crossing a cell site are attenuated in substantial amount so that they are perceived as lower level noise by base stations in distant cell sites. Frequency isolation occurs in free space because the RF signals are inherently attenuated in proportion to the square of the distance from the radiating source. Isolation is furthered by interference arising from man-made and natural structures.

One or more frequencies are set aside for setting up a communication link or call between the base station 14 and a subscriber unit 12.

The base stations 14 are interlinked with a network controller 16 via a distribution facility such as a dedicated copper wire or fiber optic network, a radio communication link, or a satellite link. The satellite link provides the highest system capacity. The network controller 16, in turn, provides access to existing wireline telephone networks. Each base station 14 determines the received signal strength of each call in progress, and forwards this information to the network controller 16. The network controller 16 uses advanced processing technology to keep track of all calls between the subscriber units 12 and base stations 14. The network controller 16 also uses the signal strength information from each base station 14 to determine when a call should be "handed off" from the base station in one cell site to the base station in another cell site. Hand-off allows communication to be maintained with a subscriber unit 12 as the subscriber unit 12 roams from cell site to cell site.

Video, audio and data are transmitted over the airwaves as digital signals between the subscriber units 12 and base stations 14. Sources of video, audio and data are not limited to other subscriber units 12 in the system 10. Since the base stations 14 are linked to telephone networks, data can be provided over wired networks by sources such as private faxes and corporate computers containing commercial databases. Audio can be provided over wired networks by analog telephones, personal computers and even radios. Video can be provided by direct broadcast satellites and Very Small Aperture Terminals, and by computers over fiber optic and ISDN networks.

Within a cell site, each frequency bandwidth is "shared" by all subscriber units 12, either through a Time Division Multiple Access ("TDMA") technique or a Code Division Multiple Access ("CDMA") technique. The TDMA technique divides up the total bandwidth into a predetermined number of time slots, with each subscriber unit 12 being allocated a specific time slot. One of the time slots contains an imbedded control channel. Each base station 14 continuously transmits time division multiplexed bit streams to the subscriber units 12 on the downlink frequency, with each subscriber unit 12 responding by transmitting bursts on the uplink frequency. Even if a base station 14 is not communicating with a subscriber unit 12, a dummy time slot transmission is sent.

The CDMA technique, instead of dividing up the total bandwidth into time slots, spreads the signal of each subscriber unit 12 across the entire bandwidth. Although each subscriber unit 12 generally occupies the entire bandwidth designated by the base station 14, it utilizes only a portion of the power available to the base station 14. The information-bearing signal is multiplied by a high bandwidth, high frequency digital spreading signal, which expands the narrow bandwidth information-bearing signal into a broad spread signal covering the entire transmission bandwidth. The spreading signal uses quasi-orthogonal bit sequences of period Tc, referred to in the art as chips. The chip sequence causes the cross-correlation function between subscriber units 12 to be small, in which event the subscriber units 12 are quasi-orthogonal to each other. The chip sequence can be generated or chosen so that a predetermined or unique chip sequence is assigned to a specific subscriber unit 12 during the call set up each time the subscriber unit 12 starts a call. This, of course, requires the network controller 16 to maintain a central log or listing of all user chip sequence assignments.

Figure 2:
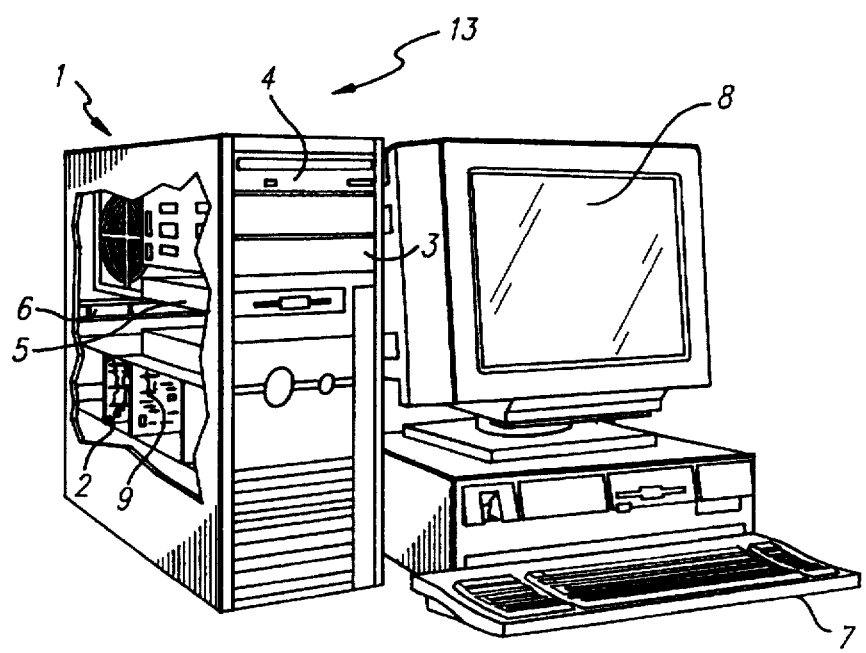
FIG. 2 is a block diagram of a personal computer according to the present invention.

FIG. 2 shows the personal computer 13 according to the present invention. The computer 13 includes a tower 1 for housing a motherboard 2, which includes a microprocessor, Random Access Memory (RAM), BIOS, cache and expansion bus slots. The microprocessor can be a "PENTIUM" processor, a RISC-based processor (e.g., MIPS, "PowerPC") or a more powerful processor. The tower 1 also includes a hard disk drive 3, and peripherals such a CD ROM drive 4 and a floppy disk drive 5. A keyboard 7 provides basic input commands to the computer, and video is output over a display 8. The tower 1 further includes a backplate 6 for accommodating expansion boards and cards such as internal modem cards, graphics accelerator boards, video capture cards, and sound cards. The expansion boards and cards are connected to the expansion slots. Audio signals can be supplied to the sound card by a hand held microphone and they can be outputted from the sound card to a speaker system. Video signals can be supplied to the video capture card by a hand held camera. The video images from the camera are quantized by the video capture card in both the spatial domain and the intensity domain. The backplate 6 also accommodates a wireless communications board 9 for allowing the computer 13 to communicate over the airwaves.

Figure 3:
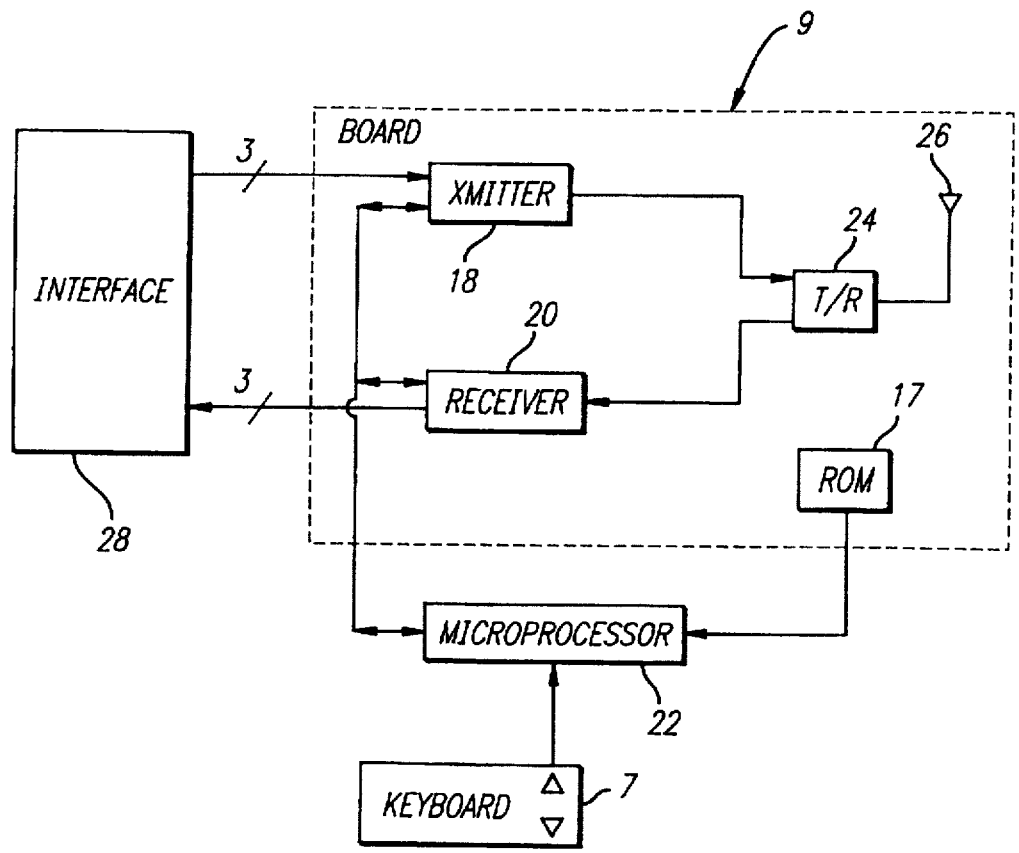
FIG. 3 is a block diagram of a wireless communication card for the personal computer shown in FIG. 2.

Referring now to FIG. 3, the wireless communications board 9 includes a Read Only Memory (ROM) 17, transmitter 18, receiver 20, T/R module 24 and a high efficiency antenna 26. The ROM 17 stores an application program for the microprocessor 22. When programmed by the ROM 17, the microprocessor 22 defines and implements the protocol for the computer 13. In an alternative embodiment, the application program could be stored on one of the computer's storage devices, such as the hard disk. This would eliminate the need for the ROM 17.

The protocol defines the convention through which the personal computer 13 can communicate with the base station 14. The microprocessor 22 decodes the header of each base station transmission and executes a protocol structure which controls timing and decision making logic instructions (e.g., timing, message slot selection, T/R control) and other well known operations. Prior to a call setup, the computer 13 monitors air time, activity, account numbers, and protocol of the base station 14 to determine whether it can access the system 10. When the computer 13 is ready to make a call, or when a call is transmitted to it, the computer 13 establishes a setup channel with a proximate base station 14. During call setup, the base station 14 specifies the unique time slots and uplink/downlink frequencies for the computer 13 to transmit and receive the call.

In addition to these well known operations, the microprocessor 22 allocates the RF bandwidth among the audio, video and data signals. Bandwidth is allocated by varying the compression rates of the audio and video signals. The compression rates are dynamically varied to allow as much audio and video as possible to be transmitted within their allocated bandwidths. When the audio compression rate is decreased, the bandwidth of the audio is increased and the bandwidth of the video is decreased. As a result, audio fidelity is improved and video quality is degraded. Conversely, when the audio compression rate is increased, the audio bandwidth is decreased and the video bandwidth is increased. This results in an improvement of the video quality and a degradation of the audio fidelity.

The personal computer 13 automatically performs the bandwidth allocation in response to a request from another party on the communication link. If the other party desires a higher quality audio, it sends an appropriate request to the personal computer 13. The personal computer 13 responds by decreasing the audio compression rate to improve the quality of the audio being transmitted to the other party. If it is desired for the personal computer 13 to receive higher quality video, an input for lower sound fidelity is made by using an input device such as the keyboard 7, and the personal computer 13 transmits the request for lower audio fidelity to the other party. Docket No.

This requires a protocol that is tailored for dynamic bandwidth allocation of video and audio signals. To implement this protocol, two bits in a transmission header are dedicated to the request. The two bits represent four possible conditions: audio increase, audio decrease, no change in audio, and preset audio.

On the receiving end, the microprocessor 22 constantly checks for requests from the other party by monitoring the transmission headers received during the communication link. When the personal computer 13 receives a request, its microprocessor 22 determines the appropriate bandwidths for the audio and video signals.

Using the bandwidths supplied by the microprocessor 22, the transmitter 18 compresses the audio and video signals. Following compression, audio, video and data signals are broken up into transport packets and multiplexed together with the transmission header (which includes the two-bit request) to form a composite signal. The composite signal is further processed by the transmitter 18 into either a spread spectrum signal or a time division multiplexed signal, depending upon whether CDMA or TDMA is being used by the system 10. The encoded signal is used to modulate a carrier signal. The modulated carrier signal is sent to the antenna 26 through the T/R module 24. For personal computers 13 that do not have a video capability, only audio and data signals are multiplexed with the header to form the composite signal, with compression being performed on the audio signal only.

RF signals received on the antenna 26 are sent to the receiver 20 through the T/R module 24. The receiver 20 separates the incoming signal into four demodulated signals: a compressed video signal, a compressed audio signal, a data signal and a transmission header. The transmission header is sent to the microprocessor 22 and monitored for a request to increase audio fidelity. The compressed video signal, compressed audio signal and the data signal are unformatted. The compressed signals are then decompressed using compression rates embedded in the compressed signals. The decompressed signals, along with the unformatted data signal, are forwarded to the appropriate interfaces 28 in the personal computer 13.

When displaying the video image, a dither or similar technique is used. This allows a reduction in the amount of video information necessary to display a quality image. A VGA-based CRT can display 640 horizontal by 480 vertical pixels (640×480). CRTs typically have a set of three phosphors—red, green and blue—at each pixel location. This allows each pixel to display a gamut of colors falling within a three dimensional cube. Colors at the eight vertices of the cube are black, white, red, green, blue, cyan, magenta and yellow. Colors within the cube are produced by mixtures of various intensities of red, green, and blue. Digital words representing the colors are converted to an analog video signal, which causes an electron gun to illuminate the phosphors of the CRT, thereby creating light.

The higher the color and spatial resolutions of the reproduced image, the better its perceived image quality. Color resolution is equivalently measured by the number of data bits for storing each pixel of the image in a computer's video memory. The display of "true color" would requires a bit length of 24 bits. However, the amount of video information would be enormous.

The amount of video information is drastically reduced by limiting the bit length to 8-bits and using a simulation technique to simulate the true colors of an image. Pixel words of 8-bitcan display 256 colors simultaneously, and the simulation technique can be used to simulate many of the 16 million colors offered by 24-bit resolution.

One approach for simulating the true colors is to employ a color palette or lookup table containing an optimal selection of colors. The palette contains those colors which occur most frequently in the image being reproduced. For 8-bit color resolution reproductions, the 256 colors used most frequently in the image are be chosen to fill the color palette. When the image is reproduced, each color in the video image is mapped to the nearest color in the palette. Usually, the quality of the resulting image is improved since the true color of most of the image's pixels will be in the palette.

Another approach is to employ a dither technique, which permits the simulation of intensity levels between quantized levels by permitting the eye to integrate fine detail within an area and record only the overall intensity of the area. Dithering aims to sacrifice some of an image's spatial resolution for an increase in perceived intensity resolution, which is accomplished by averaging the intensities of several neighboring pixels to simulate intensities that lie between quantization levels.

Several types of dithering techniques are known. "Ordered dither" relies on the eye's ability to blend the colors of adjacent pixels over small spatial areas so that an intermediate color is perceived. This approach focuses on replacing or mapping non-displayable colors (those not in the displayable color palette) within defined areas of the image to displayable colors to best simulate the true color when viewed by the human eye. The neighborhoods are chosen according to a two dimensional set of values, referred to as the dither table or dither matrix, which is tiled into the image's coordinate space. The values contained in the table are used to make decisions about which quantized intensity value will be output at each position, that is, should the intensity value be quantized to the quantized value above or below the original intensity value. The dither table values are different at each coordinate location such that when a constant input intensity is dithered over some area, the output values will alternate in some pattern between the upper and lower quantized intensity levels.

Hardware and software for displaying the video image using a dither technique is readily available.

In the past, the above techniques were used to reduce memory requirements of the display system. Here, however, the above techniques are used to reduce the number of transmitted video bits. In combination with data compression, the video information can be minimized, yet "true color" quality of the video image can still be maintained.

Figure 4:
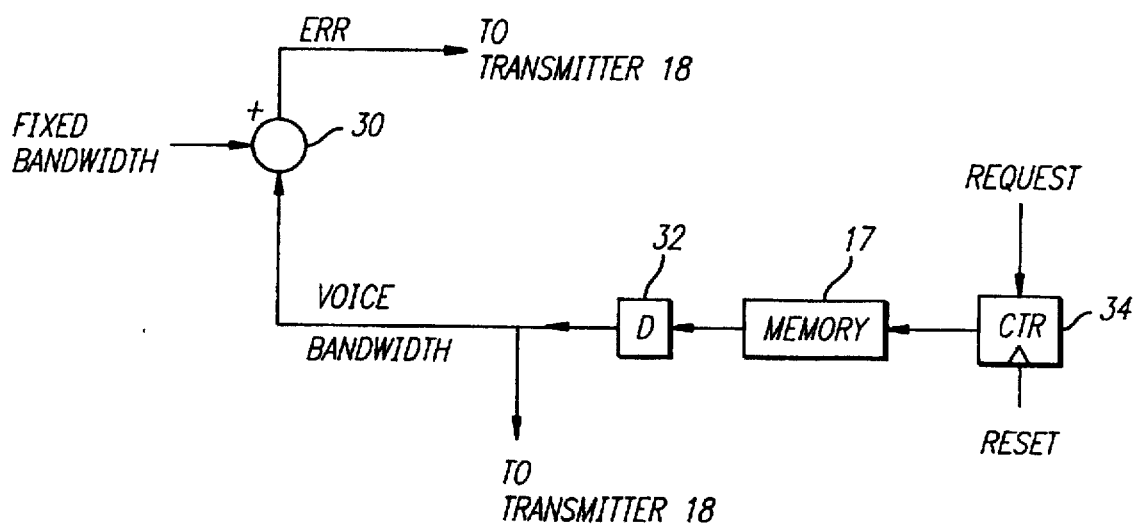
FIG. 4 is a logic diagram for the dynamic allocation of an RF bandwidth among video and audio signals.

FIG. 4 shows the logic executed by the microprocessor 22 for the dynamic allocation of the RF bandwidth among the video and audio signals. Although the logic is depicted in terms of hardware elements, the functions performed by the elements are performed through the use of software. The logic includes a summing junction 30 for generating an error signal ERR indicating the difference between the RF bandwidth and the audio bandwidth. The error signal ERR is, of course, equal to the video bandwidth, the available bandwidth for video signal. The error signal ERR is supplied to a video compression module the transmitter 18, which compresses the video signal until the video signal fits within the video bandwidth.

The audio bandwidth is also supplied to the transmitter 18. The transmitter 18 compresses the audio signal until it fits within the audio bandwidth.

The RF bandwidth is an a priori value that can be hardwired to the summing junction 30. The audio bandwidth is supplied to the summing junction 30 via a latch 32. An input of the latch 32 is coupled to the ROM 17, which stores a number of different values indicating different audio bandwidths for the audio signal. The bandwidth values are stored in the ROM 17 during manufacture. If a ROM 17 is not employed, and the application program is stored on the hard drive, the bandwidth values can be reprogrammed by the user.

In the alternative, bandwidth pairs could be stored in the ROM. Each pair includes an audio bandwidth and a video bandwidth. The video and audio bandwidths selected pair are supplied to the transmitter 18.

The bandwidth value supplied to the latch 32 by the ROM 17 is selected by a counter 34, which indexes the ROM 17. Assume that the bandwidth values are stored in consecutive addresses in the ROM 17, and that the values increase as the addresses increase. Incrementing the counter 34 causes the ROM 17 to output a greater bandwidth value. As the value stored in the latch 32 is increased, the error signal ERR and, therefore, the available bandwidth for video signal are decreased. As a result, video quality is decreased. Decrementing the count results in a lower bandwidth value to be supplied to the latch 32 by the ROM 17. As the bandwidth value stored in the latch 32 is decreased, the error signal ERR and, therefore, the available bandwidth for the video signal are increased.

The counter 34 can be reset to a preset value. This allows the audio bandwidth to be preset at any time during a call.

Requests to increment and decrement the counter 34 are supplied to an input of the counter 34. The requests are derived from the two-bit request of the transmission header.

Figure 5:
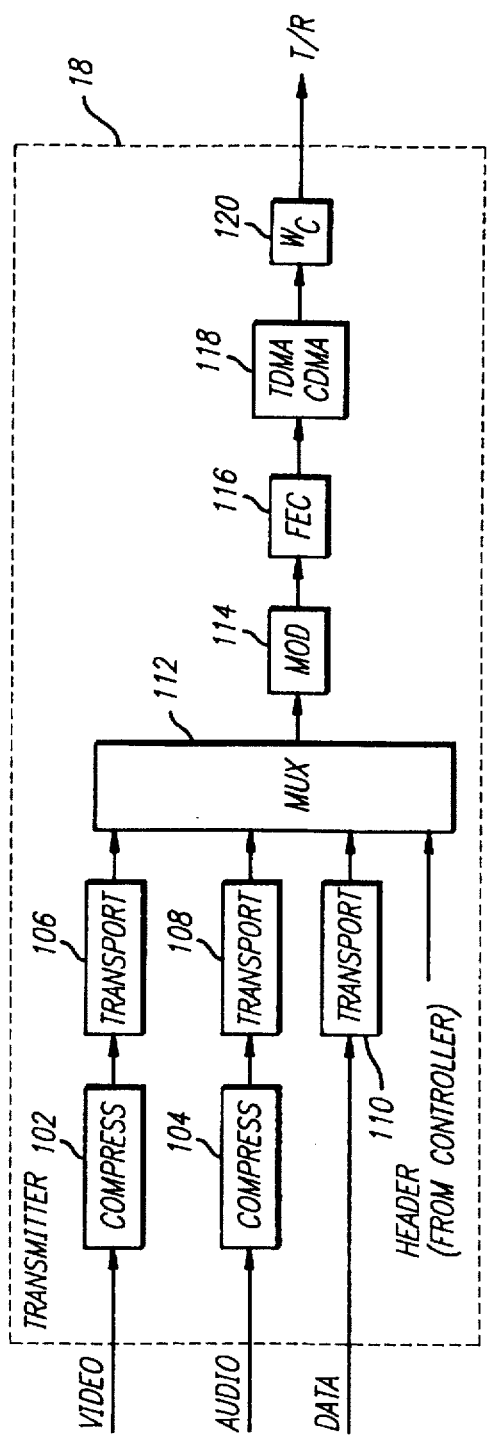
FIG. 5 is a block diagram of a transmitter which forms a part of the wireless communication card shown in FIG. 3.

FIG. 5 shows the functions performed by the transmitter 18. The digital video signal is compressed according to an algorithm that supports variable rate compression (block 102). The digital audio signal is also compressed according to an algorithm that supports variable rate compression (block 104). The video and audio signals are compressed until they fit within the video and audio bandwidths that are allocated by the microprocessor 22.

The compressed video signal is broken up into video transport packets (block 106), and the audio signal is broken up into audio transport packets (block 108). The data signal, although not compressed, is broken up into data transport packets (block 110). Each transport packet includes a header and data portion. In the case of the compressed signals, the header will indicate whether the compression rates are stored in the first few bytes of the data portion.

Apparatus and methods for compressing the audio and video signals are disclosed in U.S. Ser. No. 08/580,547 filed Dec. 29, 1995, pending and incorporated herein by reference. The apparatus supports variable rate compression and utilizes multiple compression algorithms. During a communication link, for example, the apparatus can use an MPEG-1 algorithm for both audio and video compression. During another communication link, the same apparatus can use an MPEG-2 algorithm for video compression and Dolby AC3 for audio compression.

In an alternative embodiment, the microprocessor 22 could be programmed to perform the compression on the audio and video signals. The microprocessor 22 could also be programmed to break up the data signal and the compressed signals into transport packets.

The audio, video and data transport packets are multiplexed together with the transmission header to form a composite signal (block 112). The transmission header, which is generated by the microprocessor 22, includes the two bits that request the other party to change the bandwidth of the audio signal being transmitted by that party.

The composite signal is then modulated using phase shift keying (PSK) modulation, frequency shift keying (FSK) modulation, or any other type of modulation suitable for a TDMA or CDMA system (block 114). The PSK modulation may be any of binary phase shift keying (BPSK) modulation, quadrature phase shift keying (QPSK) modulation, M-ary phase shift keying (MPSK) modulation where M is larger than four, or variants of differential phase shift keying (DPSK) modulation.

Following modulation is forward error correction (block 116). Signals to be transmitted are encoded by coding schemes such as Linear Predictive Coding (LPC) or Continuously Variable Sloped Delta (CVSD) modulation. Actual data bits forming the input signal are interleaved with additional bits for ascertaining, or monitoring errors and providing for correction.

If the system uses a CDMA technique, the digitally encoded information signal is mixed with a spreading chip sequence, which is assigned to the subscriber unit (block 118). The chip sequence is sent by the subscriber unit to the base station 14 as part of the call setup. It is desirable to spread the communication signal to cover the entire allocated bandwidth where possible and achieve a high processing gain.

The mixed broad band spread information signal is then mixed with a carrier frequency to produce the communication signals to be transmitted (block 120). The specific frequency used is predetermined by the spectral allocation for the communication system 10. The modulated signal is sent to the T/R module 24, which transmits the signal under the control of the microprocessor 22.

If the system uses a TDMA technique, the digitally encoded information signal is used to modulate a carrier frequency only during the allocated time slot (blocks 112 and 114). The resulting burst is transmitted by the T/R module.

Figure 6:
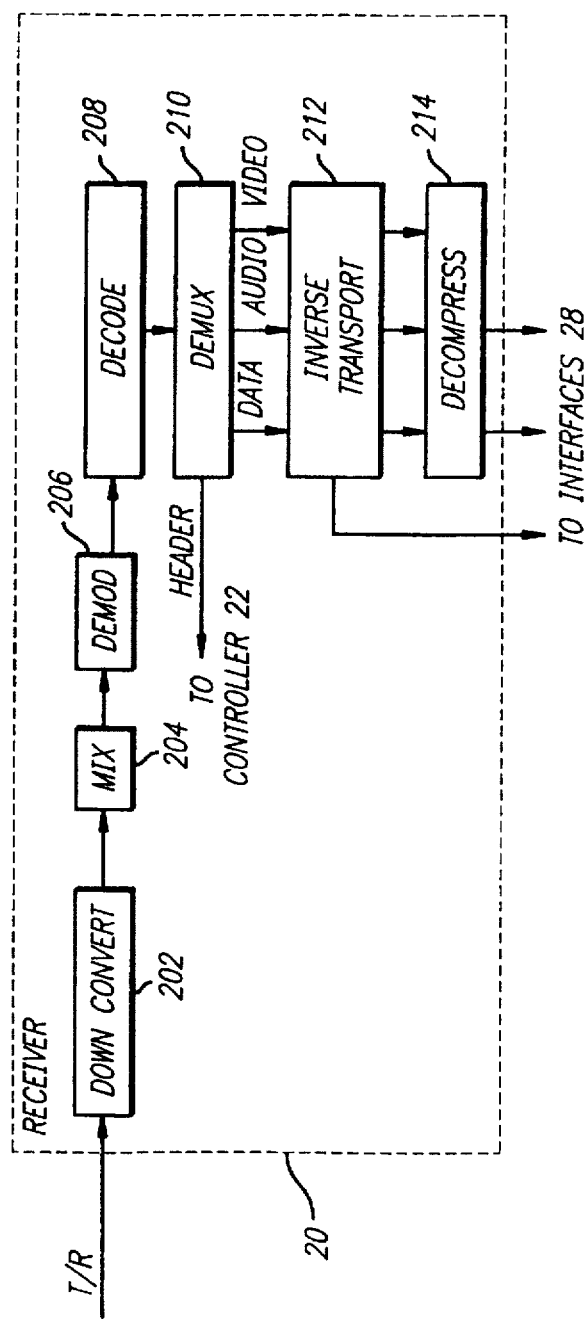
FIG. 6 is a block diagram of a receiver which forms a part of the wireless communication card shown in FIG. 3.

FIG. 6 shows the functions performed by the receiver 20. The receiver 20 performs low noise amplification on the signal received from the antenna and T/R module and down converts the amplified signal into an intermediate frequency (IF) signal (block 202). Gain control of the IF signal is performed and the gain-controlled IF signal is mixed to form a baseband signal (block 204). The baseband signal is then locked onto and demodulated by breaking it into its in-phase (I) and quadrature (Q) components, which are converted into a digital signal (block 206). The digital signal is deinterleaved and decoded at a predetermined decoding rate by a convolutional decoder such as a Viterbi algorithm decoder (block 208). The decoded signal is then demultiplexed into a header signal and video, audio and data transport packets (block 210). The transmission header is supplied to the microprocessor 22 and the audio, data and video signals are sent to an inverse transport processor (block 212). The compressed audio and video signals are thereafter decompressed using the audio and video compression rates embedded in the data portion of the transport packet (block 214). The decompressed video and audio signals are synchronized and then forwarded, along with the unformatted data signal, to the appropriate interfaces.

Thus disclosed is an RF communication system that overcomes the problem of bandwidth limitations associated with the transmission of audio and high quality video signals. The problem is overcome by dynamically allocating the bandwidth among the audio and video signals.

Further disclosed is computer that can communicate over the airwaves. Still further disclosed is a method for configuring existing computers to communicate over the airwaves.

It is understood that various changes and modifications may be made without departing from the spirit and scope of the invention. For example, the microprocessor can use video bandwidth as the controlling parameter instead of audio bandwidth. Moreover, the invention can be applied not only to the personal computer disclosed herein, but to the personal computer described in U.S. Ser. No. 08/580,574 filed Dec. 29, 1995, pending, which is incorporated herein by reference.

It is also understood that the invention is not restricted to personal computers, and could be applied to other types of general purpose computers (e.g., workstations) and computers dedicated to specific purposes (e.g.,web browsers). Finally, it is understood that use of the invention is not limited to CDMA and TDMA communication systems, but can be applied to any other type of narrow bandwidth communications system. Accordingly, the present invention is not limited to the precise embodiment described hereinabove.

We claim:

1. A computer, comprising:

digital transceiver means operable to transmit and receive compressed video signals and compressed audio signals over a fixed bandwidth;

bandwidth determination means coupled to said transceiver means and responsive to a received transmission request signal for determining the fixed bandwidth for effecting wireless communications;

bandwidth allocation means coupled to said transceiver means for allocation of a certain portion of the determined fixed bandwidth for the compressed audio signals and another certain portion of the determined fixed bandwidth for the compressed video signals;

variable audio compression means responsive to said bandwidth allocation means for varying the compression rate of audio signals to be transmitted over said fixed bandwidth;

variable video compression means responsive to said bandwidth allocation means for varying the compression rate of video signals to be transmitted over said fixed bandwidth;

microprocessor means coupled to said transceiver means and responsive to a received transmission request signal for determining what portion of the determined fixed bandwidth to allocate to said compressed audio signals and to said compressed video signals; and wherein said bandwidth allocation means includes a computer memory for programming the microprocessor means to dynamically allocate the determined fixed bandwidth among the video and audio signals, the dynamic allocation being performed by varying the rates at which the audio and video signals are compressed.

2. A computer according to claim 1, wherein said bandwidth allocation means further includes:

a counter responsive to said microprocessor means for generating a memory address signal for facilitating the retrieval of a prestored bandwidth value stored in said computer memory;

a latch for temporarily storing said prestored bandwidth value retrieved from said computer memory; and a summer coupled to said latch for generating an error signal indicative of the difference between the value of the determined fixed bandwidth and the value of said prestored bandwidth value retrieved from said computer memory;

wherein said prestored bandwidth value retrieved from said computer memory is indicative of the bandwidth value allocation for the compressed audio signal; and wherein said error signal is further indicative of the bandwidth value allocation for the compressed video signal; and wherein the fixed bandwidth is a fixed RF bandwidth.

3. A computer according to claim 2, wherein the microprocessor means causes the RF bandwidth to be divided into a video bandwidth and an audio bandwidth.

4. A computer according to claim 3, wherein the computer memory stores a plurality of different bandwidth sets, each set including an audio bandwidth and a video bandwidth, and wherein the microprocessor means selects one of the bandwidth sets based on the determined bandwidth.

5. A computer according to claim 1, wherein the computer memory includes a ROM for storing an application program for the microprocessor means.

6. A computer according to claim 5, wherein said application program causes the microprocessor means to facilitate the compression of the audio and video signals.

7. A computer according to claim 1, wherein the transceiver means is also operable to decompress incoming audio and video signals.

8. A computer according to claim 1, wherein the transceiver means includes:

an antenna;

a T/R module coupled to the antenna;

a receiver having an input coupled to the T/R module; and a transmitter having an output coupled to the T/R module.

9. A computer according to claim 8, wherein the receiver includes:
- a demodulator for demodulating an incoming signal from the T/R module; and
- a demultiplexer for separating the demodulated signal into a transmission header and a group of signals including a video signal, an audio signal and a data signal, the transmission header being supplied to the microprocessor means for facilitating bandwidth allocation purposes.

10. A computer according to claim 9, wherein the transmitter includes:
- a first compressor for compressing the video signal to fit within a video bandwidth supplied by the microprocessor means;
- a second compressor for compressing the audio signal to fit within an audio bandwidth supplied by the microprocessor means;
- a combiner for combining the compressed video and audio signals;
- a PSK modulator responsive to an output of the combiner; and
- a carrier frequency modulator, responsive to an output of the PSK modulator.

11. A computer according to claim 10, wherein the combiner also combines the data signal with the compressed audio and video signals.

12. A computer, comprising:
- a housing including a backplate;
- a motherboard mounted inside the housing, the motherboard including:
  digital transceiver means operable to transmit and receive compressed video signals and compressed audio signals over a fixed bandwidth;
  bandwidth determination means coupled to said transceiver means and responsive to a received transmission request signal for determining the fixed bandwidth for effecting wireless communications;
  bandwidth allocation means coupled to said transceiver means for allocation a certain portion of the determined fixed bandwidth for the compressed audio signals and another certain portion of determined fixed bandwidth for the compressed video signals;
  variable audio compression means responsive to said bandwidth allocation means for varying the compression rate of audio signals to be transmitted over said fixed bandwidth;
  variable video compression means responsive to said bandwidth allocation means for varying the compression rate of video signals to be transmitted over said fixed bandwidth;
  microprocessor means coupled to said bandwidth allocation means and to said transceiver means and responsive to a received transmission request signal for determining what portion of the determined fixed bandwidth to allocate to said compressed audio signals and to said compressed video signals;
- a wireless communication board mounted in the backplate and electrically coupled to the motherboard, the wireless communication board including:
  a T/R module;
  a receiver having an input coupled to the T/R module, the receiver being operable to receive compressed video and audio signals over the determined fixed bandwidth; and
  a transmitter having an output coupled to the T/R module, the transmitter being operable to transmit compressed video and audio signals over the determined fixed bandwidth.

13. A computer according to claim 12, further comprising a storage medium for programming the microprocessor means to dynamically allocate the determined fixed bandwidth among the video and audio signals.

14. A computer according to claim 13, wherein the microprocessor means is programmed to facilitate the compression of the audio and video signals.

15. A computer according to claim 13, wherein the storage medium includes a ROM mounted to the wireless communication board.

16. A computer according to claim 12, wherein the wireless communication board further includes an antenna coupled to the T/R module.

17. A computer according to claim 12, wherein the receiver includes:
- a a demodulator for demodulating an incoming signal from the T/R module; and
- a demultiplexer for separating the demodulated signal into a transmission header and video, audio and data signals, the transmission header being supplied to the microprocessor.

18. A computer according to claim 12, wherein the transmitter includes:
- a first compressor for compressing the video signal to fit within a video bandwidth supplied by the microprocessor means;
- a second compressor for compressing the audio signal to fit within an audio bandwidth supplied by the microprocessor means;
- a combiner for combining the compressed video and audio signals;
- a PSK modulator responsive to an output of the combiner; and
- a carrier frequency modulator, responsive to an output of the PSK modulator.

19. A wireless communication board for a computer having at least a microprocessor;
- digital transceiver means operable to transmit and receive compressed video signals and compressed audio signals over a fixed bandwidth;
- bandwidth allocation means coupled to said transceiver means for allocation a certain portion of said fixed bandwidth for the compressed audio signals and another certain portion of said fixed bandwidth for the compressed video signals;
- variable audio compression means responsive to said bandwidth allocation means for varying the compression rate of audio signals to be transmitted over said fixed bandwidth;
- variable video compression means responsive to said bandwidth allocation means for varying the compression rate of video signals to be transmitted over said fixed bandwidth;
- microprocessor means coupled to said bandwidth allocation means and to said transceiver means and responsive to a received transmission request signal for determining what portion of said fixed bandwidth to allocate to said compressed audio signals and to said compressed video signals;

the board comprising:
- a T/R module;

a receiver having an input coupled to the T/R module, the receiver being operable to receive compressed video and audio signals over a fixed bandwidth;

a transmitter having an output coupled to the T/R module, the transmitter being operable to transmit compressed video and audio signals over the fixed bandwidth; and a computer storage medium for programming the microprocessor means to dynamically allocate the fixed bandwidth among the video and audio signals.

20. A wireless communication board according to claim 19, wherein the storage medium includes a ROM mounted to the wireless communication board.

21. A wireless communication board according to claim 19, wherein the wireless communication board further includes an antenna coupled to the T/R module.

22. A wireless communication board according to claim 19, wherein the receiver includes:

a demodulator for demodulating an incoming signal from the T/R module; and a demultiplexer for separating the demodulated signal into a transmission header and video, audio and data signals, the transmission header being supplied to the microprocessor means.

23. A wireless communication board according to claim 19, wherein the transmitter includes:

a first compressor for compressing the video signal to fit within a video bandwidth supplied by the microprocessor means;

a second compressor for compressing the audio signal to fit within an audio bandwidth supplied by the microprocessor means;

a combiner for combining the compressed video and audio signals;

a PSK modulator responsive to an output of the combiner; and carrier frequency modulator, responsive to an output of the PSK modulator.

24. A wireless communication board according to claim 19, wherein the computer storage medium causes the microprocessor means to perform the steps of:

selecting audio and video bandwidths for the audio and video signals; and supplying the audio and video bandwidths to the transmitter, the transmitter compressing the audio and video signals to fit within the audio and video bandwidths, respectively.

25. A wireless communication board according to claim 19, wherein the computer storage medium causes the microprocessor means to perform the steps of:

processing headers in incoming signals to determine whether requests to change bandwidth allocation have been made;

and changing the audio and video bandwidths in response to the request.

26. A wireless communication board according to claim 19, wherein the computer storage medium causes the microprocessor to perform the step of selecting audio and video bandwidths for the audio and video signals; and compressing the audio and video signals to fit within the audio and video bandwidths, respectively.

27. A computer storage medium comprising a plurality of instructions to cause a computer to perform the steps of:

allocating a certain portion of said fixed bandwidth for the compressed audio signals;

allocating another certain portion of said fixed bandwidth for the compressed video signals;

varying the compression rate of audio signals to be transmitted over said fixed bandwidth;

varying the compression rate of video signals to be transmitted over said fixed bandwidth;

determining what portion of said fixed bandwidth to allocate to said compressed audio signals and to said compressed video signals;

selecting audio and video bandwidths for audio and video signals to be transmitted over a fixed bandwidth; and compressing the audio and video signals to fit within the audio and video bandwidths, respectively.

28. A computer medium according to claim 27, wherein the instructions further cause the computer to perform the steps of:

processing headers in incoming signals to determine whether requests to change bandwidth allocation have been made;

and changing the audio and video bandwidths in response to the request.

29. A method of configuring a computer for wireless communications, comprising the steps of:

installing a wireless communication board in the computer, the board including at least one digital transceiver operable to transmit and receive compressed video and audio signals over a fixed bandwidth; and storing instructions in computer memory, the instructions causing the computer to dynamically allocate the fixed bandwidth among the video and audio signals, the dynamic allocation being performed by varying the rates at which the audio and video signals are compressed;

said computer performing the steps of allocating a certain portion of said fixed bandwidth for the compressed audio signals and another certain portion of said fixed bandwidth for the compressed video signals;

varying the compression rate of audio signals to be transmitted over said fixed bandwidth;

varying the compression rate of video signals to be transmitted over said fixed bandwidth; and determining what portion of said fixed bandwidth to allocate to said compressed audio signals and to said compressed video signals.

30. A method according to claim 29, wherein the instructions are stored in a memory device mounted to the board, the instructions being stored prior to installation of the board.

31. A method according to claim 30, wherein the instructions are stored in a peripheral drive of the computer, the instructions being stored after installation of the board.

* * * * *